United States Patent
McNamara et al.

(10) Patent No.: US 11,417,434 B2
(45) Date of Patent: Aug. 16, 2022

(54) PULSED MERGING COMPRESSION IN A SPHERICAL TOKAMAK REACTOR

(71) Applicant: Tokamak Energy Ltd., Oxfordshire (GB)

(72) Inventors: Steven Antony Milton McNamara, London (GB); David Kingham, Oxford (GB)

(73) Assignee: Tokamak Energy Ltd., Abingdon (GB)

( * ) Notice: Subject to any disclaimer, the term of this patent is extended or adjusted under 35 U.S.C. 154(b) by 60 days.

(21) Appl. No.: 16/758,655

(22) PCT Filed: Oct. 19, 2018

(86) PCT No.: PCT/GB2018/053024
§ 371 (c)(1),
(2) Date: Apr. 23, 2020

(87) PCT Pub. No.: WO2019/081895
PCT Pub. Date: May 2, 2019

(65) Prior Publication Data
US 2020/0343005 A1    Oct. 29, 2020

(30) Foreign Application Priority Data
Oct. 24, 2017 (GB) ...................................... 1717455

(51) Int. Cl.
*G21B 1/05*     (2006.01)
*H01F 6/06*     (2006.01)
(Continued)

(52) U.S. Cl.
CPC ............... *G21B 1/057* (2013.01); *H05H 1/12* (2013.01); *H01F 6/06* (2013.01); *H05H 1/16* (2013.01); *Y02E 30/10* (2013.01)

(58) Field of Classification Search
CPC ........ G21B 1/057; G21B 1/052; G21B 1/055; G21B 1/11; G21B 1/13; G21B 1/15;
(Continued)

(56) References Cited

U.S. PATENT DOCUMENTS 3,069,344 A * 12/1962 Post ........................ H05H 1/00
                                                        310/11
4,274,919 A *  6/1981 Jensen .................... G21B 1/057
                                                        376/133
(Continued)

OTHER PUBLICATIONS

Tanabe, H., Yamada, T., Watanabe, T., Gi, K., Kadowaki, K., Inomoto, M., . . . & MAST Team. (2015). Electron and ion heating characteristics during magnetic reconnection in the mast spherical tokamak. Physical review letters, 115(21), 215004. (Year: 2015).*
(Continued)

*Primary Examiner* — Darlene M Ritchie
(74) *Attorney, Agent, or Firm* — Michael Best & Friedrich LLP

(57) ABSTRACT

A method of operating a nuclear fusion device. The nuclear fusion device comprises a toroidal plasma chamber and has poloidal field coils configured to form a plasma within the plasma chamber by one of merging compression and double null merging. A varying current is provided to the poloidal
(Continued)

field coils. The varying current comprises a plurality of pulses. Each pulse comprises a plasma formation period having a rate of change of current which is opposite in sign to the current; and a merging period following the plasma formation period and having a current sufficiently low in magnitude as to allow plasmas within the chamber to merge into a single plasma. The current during the plasma formation period is varied such that the energy density of the single plasma immediately after merging is sufficient for fusion to occur.

9 Claims, 4 Drawing Sheets

(51) Int. Cl.
H05H 1/12 (2006.01)
H05H 1/16 (2006.01)

(58) Field of Classification Search
CPC ... G21B 1/17; G21B 1/19; G21B 1/21; G21B 1/23; G21B 1/00; H05H 1/12; H05H 1/00; H05H 1/02; H05H 1/10; H05H 1/14; H05H 1/16; H05H 1/18; H05H 1/20; H05H 1/22; H05H 1/24; H05H 1/46; H05H 1/4645; H05H 1/4652; H05H 2007/022; H05H 2007/025; H05H 2007/027; H05H 3/06; H05H 7/02; H05H 2277/13; H01F 6/06; H01F 17/06; H01F 17/062; Y02E 30/10

See application file for complete search history.

(56) References Cited

U.S. PATENT DOCUMENTS

| | | | |
|---|---|---|---|
| 2011/0142185 A1* | 6/2011 | Woodruff | G21B 1/05 376/121 |
| 2013/0221845 A1* | 8/2013 | Edwards | H05H 1/18 315/39.55 |
| 2014/0211900 A1* | 7/2014 | Kingham | H05H 1/12 376/133 |

OTHER PUBLICATIONS

Search Report issued from the United Kingdom Patent Office for related Application No. GB1717455.8 dated Apr. 25, 2018 (3 pages).
International Search Report with Written Opinion for related Application No. PCT/GB2018/053024 dated Dec. 12, 2018 (9 pages).
International Preliminary Report on Patentability for related Application No. PCT/GB2018/053024 dated Sep. 26, 2019 (10 pages).
Tanabe et al., "Investigation of merging/reconnection heating during solenoid-free startup of plasmas in the MAST Spherical Tokamak", Nuclear Fusion vol. 57, No. 5, Apr. 3, 2017, (pp. 1 to 8).
Raman et al., "Solenoid-free plasma start-up in spherical tokamaks", Plasma Physics and Controlled Fusion vol. 56, No. 10, Sep. 22, 2014, pp. 1 to 19, see Section 3 on pp. 10 to 12 in particular.
Gryaznevich et al., "Merging-compression formation of high temperature tokamak plasma", Nuclear Fusion, vol. 57, No. 7, Mar. 10, 2017, Abstract.

* cited by examiner

PULSED MERGING COMPRESSION IN A SPHERICAL TOKAMAK REACTOR

FIELD OF THE INVENTION

The present invention relates to pulsed neutron source or power source.

BACKGROUND

A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a risk of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and building costs reduced.

To obtain the fusion reactions required for economic power generation (i.e. much more power out than power in), a conventional tokamak would have to be huge so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement vessel and associated magnets.

During the initial phase of starting up a tokamak, the neutral gas which fills the confinement vessel must be ionised to produce a plasma. The process, known as "breakdown", "formation" or "initiation", is achieved by passing a time varying current through toroidally wound poloidal field (PF) coils of the tokamak. This time varying current generates a "loop voltage" inside the vessel that, when sufficiently large, causes the gas to break down and form a plasma. The loop voltage produced is a function of the position of the toroidal field coils and the time variation of the current. As well as generating a loop voltage inside the vessel, a current will also be induced in any other toroidally wound conducting loops (e.g. the plasma or the confinement vessel wall).

The most common plasma formation technique uses a solenoid wound in the central column of the tokamak to carry the time varying current and generate the loop voltage. This method is well known, reliable, and used in the majority of tokamaks. However, the compact geometry of spherical tokamaks means that the method is difficult to implement for them—there is limited space in the centre of the torus, and the space is needed for the toroidal field coils, cooling, and neutron shielding. As the size and efficiency of a spherical tokamak is related to the size of the central region, it would be beneficial to operate without a solenoid. Current spherical tokamaks such as MAST and NSTX use a solenoid—but the increased neutron load expected in next generation fusion reactors would make the designs used for those tokamaks impractical due to the extra shielding required.

If a solenoid is not used, then other means must be used to initiate the plasma. Two techniques of interest are "(standard) merging compression" (MC) and "double null merging compression" (DNM/double null merging). Plasma formation via merging (either MC or DNM) has further advantages over formation via solenoid. It is theoretically possible (though not yet experimentally confirmed) to achieve high plasma temperature and high plasma currents directly from the merging plasma formation, e.g. plasma temperature greater than 10 keV, which would bring the plasma into the burning regime where self-heating of the plasma is significant. Operating in the burning regime is essential for a practical fusion reactor.

A schematic of the phases of merging compression startup is shown in FIGS. 1A to 1D. Merging compression uses two PF coils 101, one in each of the upper and lower halves of the vacuum vessel 100 to generate the required loop voltage. The current in the PF coils begins at some initial positive value. As this is reduced to zero, two plasma rings 102 are formed around the coils (FIG. 1A). Because each plasma ring carries a current in the same direction, they are attracted towards each other (FIG. 1B) and merge to form a single plasma 103 (FIG. 10). During this merging phase, magnetic energy is converted to kinetic energy in the plasma, accelerating the plasma particles and raising their temperature ("magnetic reconnection"). The speed at which the plasma rings merge can be increased by continuing to reduce the PF coil current below zero, such that it repels the plasma rings and forces them towards each other. The merged plasma is compressed radially inwards, providing additional heating and further increases in the plasma current (FIG. 1D).

Merging compression has been successfully demonstrated on a number of devices, including MAST and START. However, the approach described above is considered to be impractical for a commercial fusion reactor. The PF coils must be inside the plasma vessel and located close to the final plasma, which means that they would be exposed to intense neutron irradiation and heat flux. The lifetime of such coils would be very limited, and maintaining or replacing components inside the plasma vessel is difficult and expensive.

Double null merging circumvents the problems associated with standard merging compression by using two pairs of coils, with each pair creating a "null point" in the upper or lower half of the plasma vessel. A "null point" (or X-point") is a location where the net poloidal magnetic field is zero. The present discussion is concerned only with a null point in the poloidal magnetic field, and there will still be some toroidal magnetic field present at the (PF) null points. As shown in FIG. 2, a PF null point 200 can be formed by passing a current in the same direction through two PF coils 201—the PF null will form at a location between them determined by the relative currents in each coil. As there is no PF in this location, the plasma lifetime is relatively large, so plasma will tend to form around the null points. Once a plasma is generated at the PF null points, it can be merged in a similar manner to standard MC.

The use of PF coils in pairs to create null points enables these PF coils to be placed outside the plasma vessel. A schematic of DNM is shown in FIGS. 3A to D. In the first phase (FIG. 3A), a PF null 301 is created between each pair of PF coils 302. The nulls are created in the upper and lower halves of the plasma vessel. In the second phase (FIG. 3B), the current in the PF coils is reduced. This generates a loop voltage at the null points, causing the neutral gas to breakdown and form a plasma 303. In the third phase (FIG. 3C) the current continues reducing and becomes negative, repelling the plasma rings from the null points and causing them to merge (undergoing magnetic reconnection 304 as with MC). In the fourth phase (FIG. 3D), the plasma is compressed towards the central column 305 to further increase the plasma temperature and current.

SUMMARY

According to a first aspect of the present invention, there is provided a method of operating a nuclear fusion device. The nuclear fusion device comprises a toroidal plasma chamber and has poloidal field coils configured to form a plasma within the plasma chamber by one of merging compression and double null merging. A varying current is provided to the poloidal field coils. The varying current comprises a plurality of pulses. Each pulse comprises a plasma formation period having a rate of change of current which is opposite in sign to the current; and a merging period following the plasma formation period and having a current sufficiently low in magnitude as to allow plasmas within the chamber to merge into a single plasma. The current during the plasma formation period is varied such that the energy density of the single plasma immediately after merging is sufficient for fusion to occur.

According to a second aspect, there is provided a method of generating neutrons by operating a nuclear fusion device by a method according the first aspect.

According to a third aspect, there is provided a nuclear fusion device. The nuclear fusion device comprises a toroidal plasma chamber, poloidal field coils and a controller. The poloidal field coils are configured to form a plasma within the plasma chamber by one of merging compression and double null merging. The controller is configured to vary current to the poloidal field coils such that the varying current comprises a plurality of pulses. Each pulse comprises a plasma formation period having a rate of change of current which is opposite in sign to the current; and a merging period following the plasma formation period and having a current sufficiently low in magnitude as to allow plasmas within the chamber to merge into a single plasma. The controller is further configured to vary the current during the plasma formation period such that the energy density of the single plasma immediately after merging is sufficient for fusion to occur.

DETAILED DESCRIPTION

Figure 1:
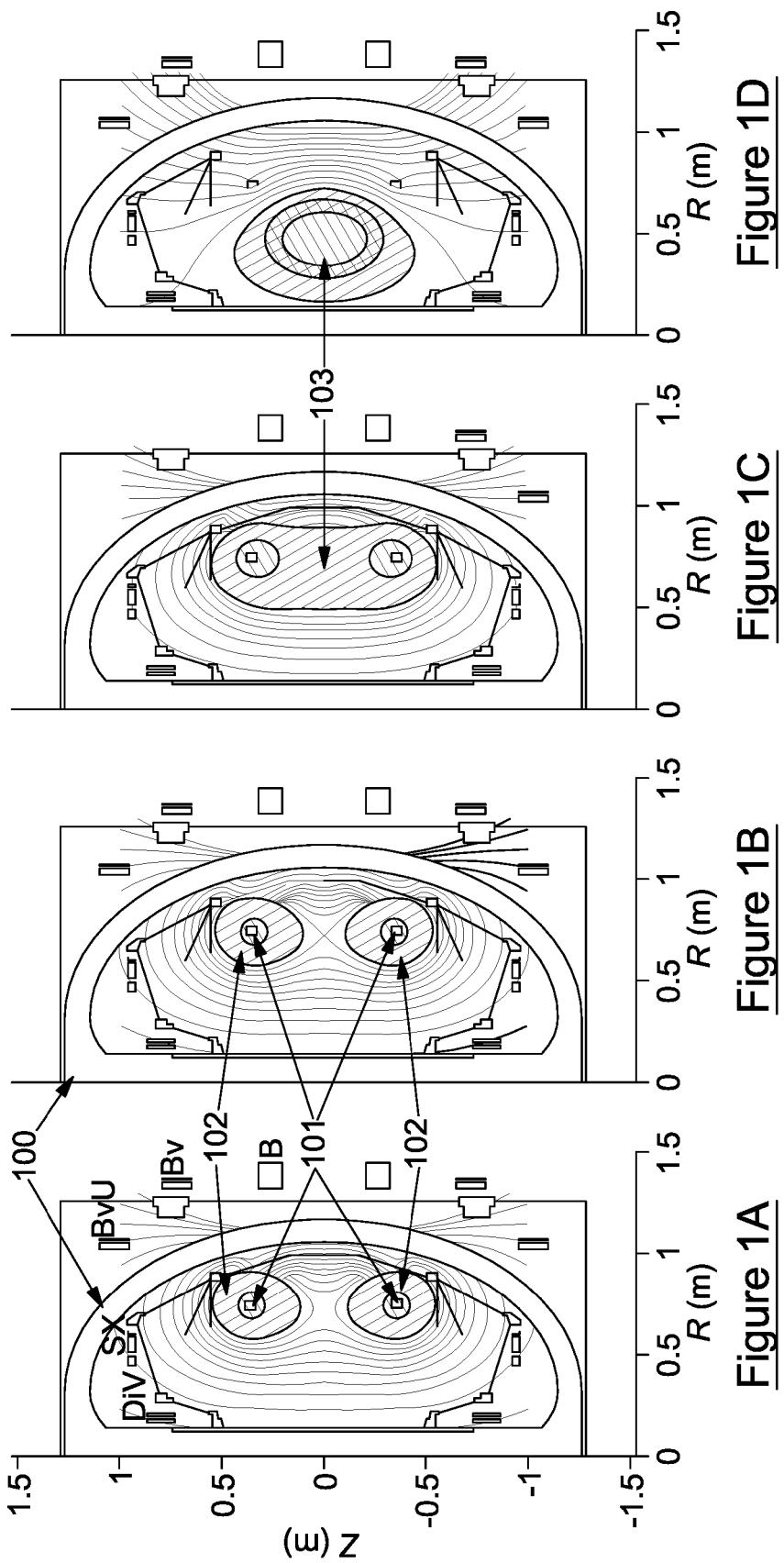
FIGS. 1A to 1D are schematic illustrations of the stages of merging compression.
Figure 2:
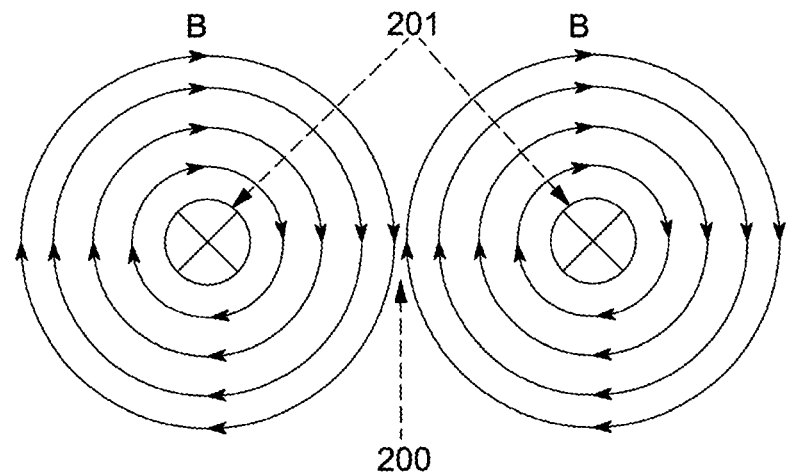
FIG. 2 illustrates the principle of a "null point"
Figures 3A, 3B, 3C, 3D:
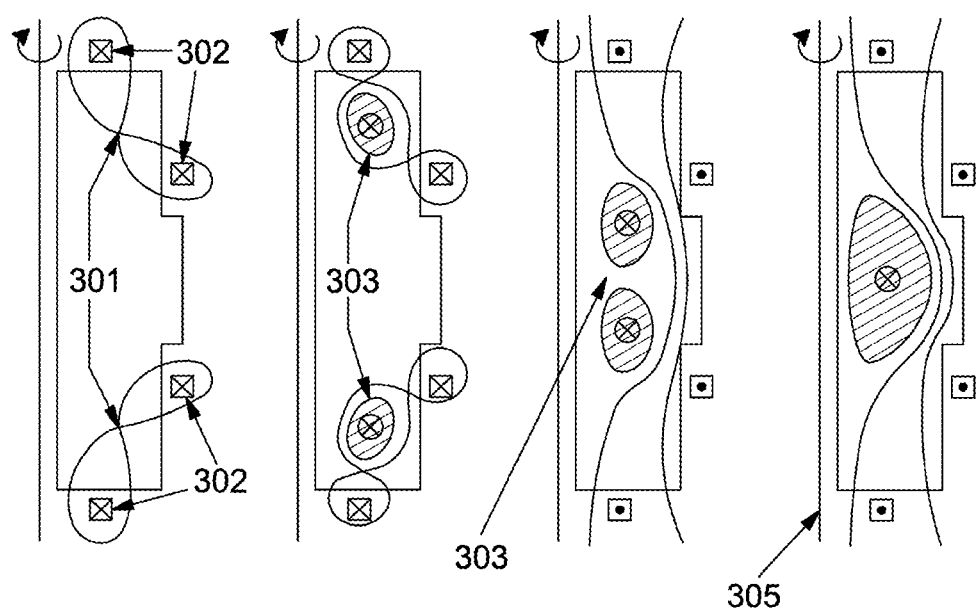
FIGS. 3A to 3D are schematic illustrations of the stages of double null merging.

In the MAST experiment (a small spherical tokamak reactor), the relationship between the plasma thermal energy immediately following merging and the current and radius of the MC coils was found to be:

$$W_{th,tot} = \left(\frac{R_c I_c}{100}\right)^2 - 2 \text{ and } W_{th,e} = 0.25\left(\frac{R_c I_c}{100}\right)^2 - 2$$

Where $R_c$, is the radius of each MC coil, $I_c$ is the peak current in each coil, $W_{th,tot}$ is the total thermal energy of the plasma and $W_{th,e}$ is the thermal energy of the electrons in the plasma. $W_{th,i}$, the thermal energy of the ions in the plasma, is given by $W_{th,tot} - W_{th,e}$ (neglecting impurities). There are other dependencies (e.g. on toroidal field strength, and potentially on the plasma volume), but considering only the dependence on the MC coil properties serves to illustrate the principle. In practice, this means that a high plasma thermal energy can be achieved with sufficiently high current—in particular, with sufficiently high current it is possible to achieve a sufficiently high ion thermal energy during merging to cause fusion without additional input. The resulting plasma would be transient and dissipate quickly unless measures were taken to maintain it, but fusion power and neutrons would still be generated for a short time.

In current tokamak research, the focus has been on producing a stable plasma from MC and other means which can achieve sustained fusion. As an alternative, it would be possible to use MC alone to produce a short-lived "burning" plasma (i.e. one undergoing fusion). Once the burning plasma has been obtained it can be allowed to dissipate, without the need to maintain it for any length of time. Instead, the MC cycle can be repeated many times. A useful power output or a useful neutron flux can be obtained if the cycle is repeated several times per second.

The fusion power per unit volume of a deuterium-tritium (D-T) plasma is given by $P_f = n_D n_T \langle \sigma v \rangle E_f$, where $E_f$ is the energy per fusion (and is constant). For temperature T=10-20 keV, the velocity average reaction cross section $\langle \sigma v \rangle$ is approximately proportional to $T^2$. Taking $n_D = n_T = n_i/2$ (i.e. equal quantities of deuterium and tritium), the fusion power per unit volume is given by:

$$P_f \propto n_i^2 T^2 E_f \propto p_i^2 E_f$$

where $p_i = n_i T$ is the thermal pressure of the ions in the plasma. This pressure is related to the thermal energy of the ions by $$p_i = \frac{2}{3}\frac{W_{th,i}}{V}$$

(where V is the volume of the plasma).
Which gives:

$$P_f \propto \left(\frac{W_{th,i}}{V}\right)^2 E_f \propto \left(\frac{W_{th,i}}{V}\right)^2 \propto \left(\frac{0.75\left(\frac{R_c I_c}{100}\right)^2 - 2}{V}\right)^2$$

For $P_f$ in MW/m$^3$, R in m, V in m$^3$ and I in kA, the equation becomes:

$$P_f \approx 1.34 \times 10^{-5} \left( \frac{0.75\left(\frac{R_c I_c}{100}\right)^2 - 2}{V} \right)^2$$

The total fusion power of the tokamak is given by $P_f V$.

The plasma volume V just after merging is approximately $V \approx 2\pi R_c \times \pi a^2$, where a is the minor radius of the plasma torus.

The volume dependence in the final equation may be the result of the as yet unknown volume dependence of the ion thermal energy density—i.e. there may be a volume dependence of the thermal energy density which means that there is no volume dependence of the fusion power density. In any case, this expression shows that once the plasma energy density after merging is sufficient for fusion, the resulting fusion power increases with the fourth power of the current in the MC coil—i.e. achieving higher energy output or neutron output is a matter of scaling up the MC coil current. For example, for a spherical tokamak with an MC coil radius of 0.75 m, and a plasma volume of 0.2 m$^3$, a current of 1.7 MA would be required to give a 1 MW total power output.

For double null merging, similar considerations will apply—though the relevant radius will be that of the null formed (as a general term to cover both MC and DNM, this can be referred to as the "radius of plasma formation"), and the dependency of the fusion power on the current of each coil will be more complicated. However, higher currents will still lead to higher fusion power once the plasma energy density on merging is sufficient for fusion to occur. Plasmas suitable for fusion other than D-T plasmas may be used, but are likely to require higher coil currents.

Figure 4A:
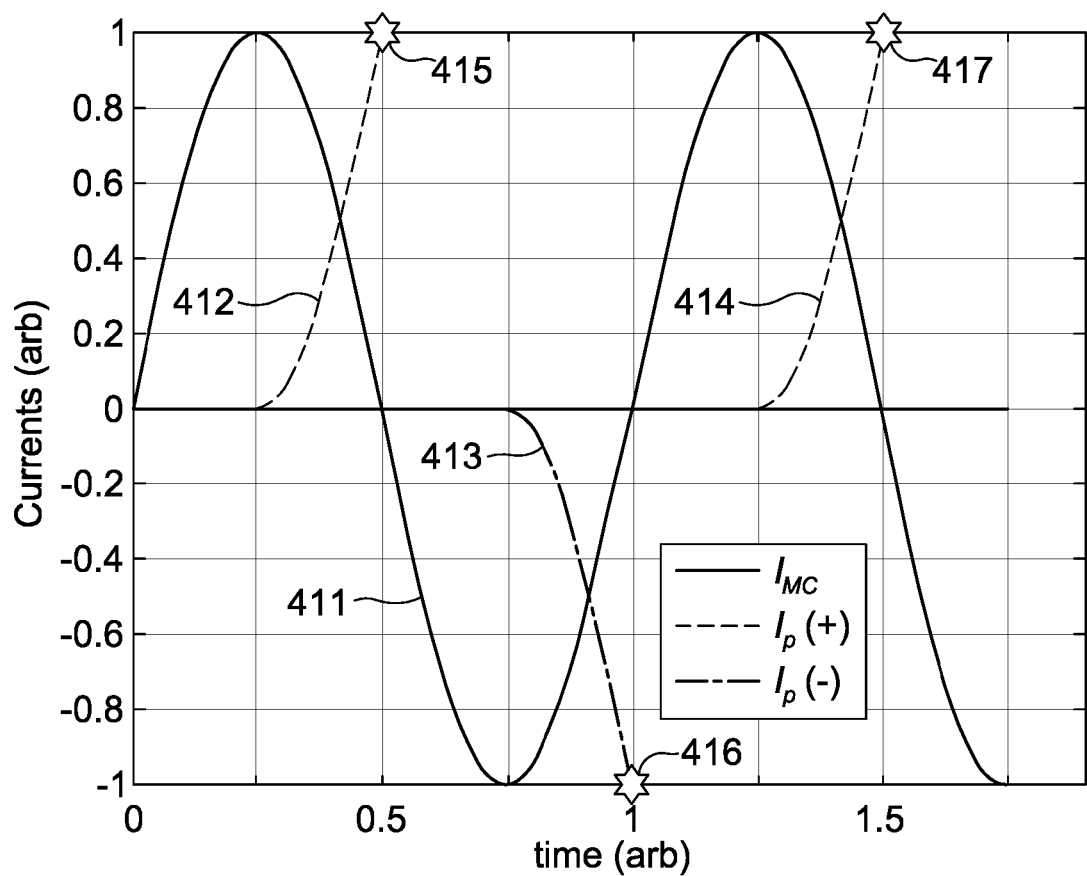
FIGS. 4A and 4B illustrate exemplary waveforms for pulsed merging.
Figure 4B:
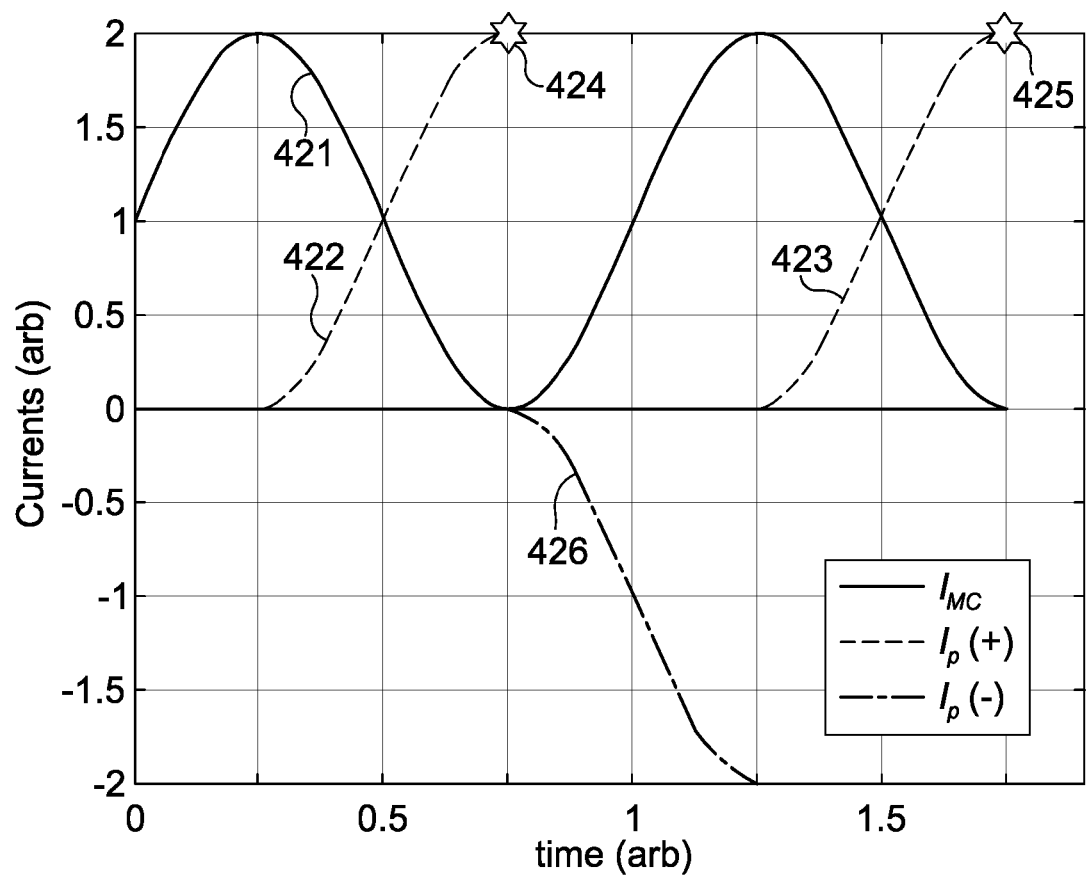

FIGS. 4A and 4B show exemplary waveforms for a pulsed power merging source (with time and current in arbitrary units). Each current waveform 411, 421 is sinusoidal in this example, although it will be appreciated that any suitable waveform may be used.

FIG. 4A illustrates a waveform 411 which oscillates around zero, and plasma formation will occur whenever the derivative of the current is the opposite sign to the current (i.e. on the downslope for I>0, and on the upslope for I<0, hereafter "plasma formation periods"). For this waveform three discrete periods of plasma current 412, 413, 414 are generated. The plasma currents 412 and 414 which are generated by the downslope of a positive coil current are positive, and the plasma current 413 which is generated by the upslope of a negative current is negative. Each cycle will have one plasma formation period with positive current, and one with negative current. In this idealised situation, the final plasma current is equal to the peak coil current. The starbursts 415, 416, 417 at the end of each plasma current plot show where merging of the plasmas from each coil occurs.

FIG. 4B illustrates an alternative waveform 421 which is biased such that I≥0, with I=0 at each minimum. This may be provided by a combination of a variable (e.g. AC) source, and a DC source which provides a bias to ensure that the total current is greater than zero. The peak current of waveform 421 is therefore twice the peak current of the waveform 411 of FIG. 4A. Positive plasma currents 422, 423 are generated once each cycle in a plasma formation period on the downslope (i.e. where the derivative of the coil current is negative), with a merging event 424, 425 occurring when the coil current reaches zero. No negative plasma current can be generated, as any plasma formed during the upslope of the current would be repelled by the coil, the dotted line 426 shows the current which would be induced if such a plasma were possible.

While the waveform 411 of FIG. 4A has twice as many plasma formation and merging events per cycle than the waveform 421 of FIG. 4B, the peak coil (and therefore plasma) current in FIG. 4A is about half that of FIG. 4B. As seen above, the fusion power scales with $I^4$, so the fusion power per merging event with the waveform of FIG. 4B is as much as 16 times that of the waveform of FIG. 4A, resulting in a total average fusion power of about 8 times greater for the waveform of FIG. 4B compared to the waveform of FIG. 4A.

The period of the waveforms will be primarily limited by the ability to generate high AC currents and the ability of the MC coils to withstand those currents. Typical MC waveforms have a period of about 10 ms, and it is expected that this could be replicated for a pulsed system, i.e. giving a frequency of 100 Hz (and therefore 200 plasma formation events per second for the waveform of FIG. 4A, or 100 plasma formation events per second for the waveform of FIG. 4B). Other frequencies of waveform may be used, e.g. greater than 10 Hz, greater than 20 Hz, or greater than 50 Hz. Waveforms other than sinusoidal waves may be used, e.g. a sawtooth wave or more complex forms. The waveform used may or may not include a compression phase—such a compression phase may increase the plasma energy, but significant fusion power will be generated purely from the merging.

For waveforms such as those of FIG. 4A which include two plasma formation phases per cycle with opposite currents, the waveforms may be half-wave symmetric (i.e. when the waveform is shifted by half a period, the signal is the negative of the original signal) such that each of the two plasma formation phases per cycle is equal and opposite.

It will be appreciated that the discussion above based on a sinusoidal waveform is intended to simplify explanation of the concept, and in practice alternative shapes of waveform may be used. In particular, it may be desirable to provide for periods between high current in order to allow recovery of the coils. It will also be appreciated that the applied current need not be strictly periodic, and as an alternative to using cycling waveforms, the plasma formation and merging periods may be provided as a series of individual pulses. The time between pulses may be variable, e.g. to provide a varying average neutron flux to a target. The pulses may be triggered by conditions within the reactor or coils as measured by a set of sensors, such as triggering a pulse when the previous plasma has dissipated or when coil deformation or temperature has recovered to an acceptable level.

The reactor may comprise a coil cooling system configured to maintain the temperature of the MC/DNM coils.

A device making use of the pulsed merging method described above may be used as a neutron source, or may be used for power generation. Such a device would comprise a toroidal plasma chamber and either merging compression coils within the plasma chamber, or double null merging coils located either inside or outside the plasma chamber (or with one coil of each pair located inside and the other located outside). Some source of helicity in the field (e.g. a toroidal field coil or a solenoid wrapped around the MC coils) will be required, but significantly less than would be needed for a conventional magnetic confinement fusion reactor, as there is no need to maintain the plasma for a significant length of time. This may reduce the requirements for toroidal field coils and other poloidal field coils compared to a conventional reactor, though their presence may allow further optimisations, e.g. pulsing other poloidal field coils in order to provide greater compression of the plasma after merging. In general, optimisations to improve plasma energy density on merging are beneficial. Optimisations which improve the stability of the plasma may be used if a longer duration of fusion in each pulse is desired.

The invention claimed is:

1. A method of operating a nuclear fusion device including a toroidal plasma chamber and having poloidal field coils configured to form a plasma within the plasma chamber by one of merging compression and double null merging, the method comprising:
providing current to the poloidal field coils, the current is varied through applying a plurality of pulses, each pulse including:
a plasma formation period where the sign of the current is opposite to its derivative; and
a merging period following the plasma formation period, where the magnitude of the current is reduced to zero to allow plasmas within the chamber to merge into a single plasma,
wherein the plasma formation period comprises a first plasma formation period with a positive current, and a second plasma formation period with a negative current.

2. The method according to claim 1, wherein the varying current is always greater than or equal to zero.

3. The method of generating neutrons, the method including operating a nuclear fusion device by a method according to claim 1.

4. The method according to claim 1 wherein the pulses are applied periodically.

5. The method according to claim 4, wherein a frequency of the pulses is greater than 1 Hz, more preferably greater than 10 Hz, more preferably greater than 100 Hz.

6. The method according to claim 4, wherein the varying current has half-wave symmetry.

7. The method according to claim 1, wherein a frequency of the pulses varies over time.

8. A method according to claim 7, and including, for each pulse:
monitoring conditions within the plasma chamber or poloidal field coils following the merging period;
initiating a subsequent pulse in dependence upon the monitored conditions.

9. A nuclear fusion device comprising:
a toroidal plasma chamber;
poloidal field coils configured to form a plasma within the plasma chamber by one of merging compression and double null merging;
a controller configured to provide current to the poloidal field coils and to vary the current through applying a plurality of pulses, each pulse including:
a plasma formation period where the sign of the current is opposite to its derivative; and
a merging period following the plasma formation period where the magnitude of the current is reduced to zero to allow plasmas within the chamber to merge into a single plasma,
wherein the plasma formation period comprises a first plasma formation period with a positive current, and a second plasma formation period with a negative current.

* * * * *